(12) United States Patent
Park et al.

(10) Patent No.: US 9,554,136 B2
(45) Date of Patent: Jan. 24, 2017

(54) METHOD AND DEVICE FOR INTRA PREDICTION

(71) Applicant: LG Electronics Inc., Seoul (KR)

(72) Inventors: Joonyoung Park, Seoul (KR); Byeongmoon Jeon, Seoul (KR); Yongjoon Jeon, Seoul (KR); Seungwook Park, Seoul (KR); Jungsun Kim, Seoul (KE); Jaehyun Lim, Seoul (KR); Hendry Hendry, Seoul (KR); Naeri Park, Seoul (KR); Chulkeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 14/356,750

(22) PCT Filed: Dec. 5, 2012

(86) PCT No.: PCT/KR2012/010490
§ 371 (c)(1),
(2) Date: May 7, 2014

(87) PCT Pub. No.: WO2013/085282
PCT Pub. Date: Jun. 13, 2013

(65) Prior Publication Data
US 2016/0044310 A1 Feb. 11, 2016

Related U.S. Application Data

(60) Provisional application No. 61/567,055, filed on Dec. 5, 2011.

(51) Int. Cl.
*H04N 19/11* (2014.01)
*H04N 19/593* (2014.01)
(Continued)

(52) U.S. Cl.
CPC ............ *H04N 19/11* (2014.11); *H04N 19/176* (2014.11); *H04N 19/44* (2014.11); *H04N 19/593* (2014.11)

(58) Field of Classification Search
None
See application file for complete search history.

(56) References Cited

U.S. PATENT DOCUMENTS

2003/0223645 A1* 12/2003 Sun ...................... H04N 19/197
382/239
2009/0141798 A1* 6/2009 Adachi ................ H04N 19/136
375/240.12
(Continued)

FOREIGN PATENT DOCUMENTS

CN    1674680    9/2005
CN    101854551   10/2010
(Continued)

OTHER PUBLICATIONS

International Search Report dated Mar. 4, 2013 for Application No. PCT/KR2012/010490, with English Translation, 4 pages.
(Continued)

*Primary Examiner* — Christopher S Kelley
*Assistant Examiner* — Kaitlin A Retallick
(74) *Attorney, Agent, or Firm* — Fish & Richardson P.C.

(57) ABSTRACT

A method for decoding an image according to the present invention comprises the steps of: receiving and decoding MPM index information for indicating an MPM candidate which is to be used as an intra prediction mode of a current block; generating an MPM candidate list containing a plurality of MPM candidates for the current block; determining the MPM candidate indicated by the decoded MPM index information as the intra prediction mode of the current block, among the plurality of the MPM candidates which constitute the MPM candidate list; and generating a predic-
(Continued)

tion block corresponding to the current block by performing intra prediction for the current block based on the determined intra prediction mode.

13 Claims, 9 Drawing Sheets

(51) Int. Cl.
*H04N 19/44* (2014.01)
*H04N 19/176* (2014.01)

(56) References Cited

U.S. PATENT DOCUMENTS

| | | | |
|---|---|---|---|
| 2011/0243229 | A1 | 10/2011 | Kim et al. |
| 2012/0314766 | A1* | 12/2012 | Chien .................. H04N 19/176 375/240.12 |
| 2014/0226912 | A1 | 8/2014 | Lee et al. |

FOREIGN PATENT DOCUMENTS

| | | |
|---|---|---|
| EP | 2797323 A1 | 10/2014 |
| JP | 2006-005438 A | 1/2006 |
| KR | 10-0940444 | 2/2010 |
| KR | 10-2010-0033676 A | 3/2010 |
| KR | 10-2010-0112247 A | 10/2010 |
| KR | 10-2011-0019855 A | 3/2011 |
| WO | WO 2010/032941 A2 | 3/2010 |
| WO | WO 2011/021844 A2 | 2/2011 |

OTHER PUBLICATIONS

Dae-Yeon, Kim et al. "Fast Intra Prediction Mode Decision using Most Probable Mode for H.264/AVC", Journal of Broadcast Engineering. vol. 15, No. 3, pp. 380-390. 2010, See pp. 381-386.
Supplementary European Search Report dated May 6, 2015 for corresponding European Patent Application No. 12855758A, 10 pages.
Chien et al., "Parsing Friendly Intra Mode Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011 (5 pages).
Kumakura et al., "Fixing the Number of mpm Candidates", Joint Collaborative Team on Video Coding (JCT-VC) of ITU-T SG16 WP3 and ISO/IEC JTC1/SC29/WG11, 6th Meeting: Torino, IT, Jul. 14-22, 2011 (8 pages).
Seregin et al., "Intra Mode Parsing Without Access Neighbouring Information", Joint Collaborative Team on Video Coding (JCT-VC) of ITU-T SG16 WP3 and ISO/IEC JTC1/SC29/WG11, 6th Meeting: Torino, IT, Jul. 14-22, 2011 (4 pages).
Yeo et al., "Non-CE6: on Intra Prediction Mode Coding", Joint Collaborative Team on Video Coding (JCT-VC) of ITU-T SG16 WP3 and ISO/IEC JTC1/SC29/WG11, 7th Meeting: Geneva, CH, Nov. 21-30, 2011 (12 pages).

* cited by examiner

METHOD AND DEVICE FOR INTRA PREDICTION

CROSS REFERENCE TO RELATED APPLICATIONS

This application is a U.S. National Phase Application under 35 U.S.C. §371 of International Application PCT/KR2012/010490, filed on Dec. 5, 2012, which claims the benefit of U.S. Provisional Application No. 61/567,055, filed on Dec. 5, 2011, the entire content of the prior applications is hereby incorporated by reference.

TECHNICAL FIELD

The present invention relates to a video processing technique, and more particularly, to intra prediction method and device.

BACKGROUND ART

In recent years, demands for a high-resolution and high-quality video such as a high definition (HD) video and an ultra high definition (UHD) video have increased in various fields of applications. However, as video data has a higher resolution and higher quality, an amount of data or a bit rate of the video to be transferred increases more than existing video data. Accordingly, when video data is transferred using media such as existing wired or wireless broadband lines or is stored in existing storage media, the transfer cost and the storage cost thereof increase. High-efficiency video compressing techniques can be used to solve such problems.

Various techniques such as an inter prediction technique of predicting pixel values included in a current picture from a picture previous or subsequent to the current picture, an intra prediction technique of predicting pixel values included in a current picture using pixel information in the current picture, and an entropy coding technique of allocating a short codeword to a value of a high appearance frequency and allocating a long codeword to a value of a low appearance frequency are known as the video compressing techniques. It is possible to effectively compress and transfer or store video data using such video compressing techniques.

SUMMARY OF THE INVENTION

Technical Problem

An object of the invention is to provide a video encoding method and a video encoder which can improve video encoding/decoding efficiency and reduce complexity.

Another object of the invention is to provide a video decoding method and a video decoder which can improve video encoding/decoding efficiency and reduce complexity.

Still another object of the invention is to provide an intra prediction method and an intra prediction device which can improve video encoding/decoding efficiency and reduce complexity.

Still another object of the invention is to provide video information transmitting method and device and device which can improve video encoding/decoding efficiency and reduce complexity.

Still another object of the invention is to provide MPM candidate list constructing method and device which can improve video encoding/decoding efficiency and reduce complexity.

Solution to Problem

According to an aspect of the invention, there is provided a video decoding method. The video encoding method includes the steps of: receiving and decoding MPM index information indicating a most probable mode (MPM) candidate to be used as an intra prediction mode of a current block; constructing an MPM candidate list including a plurality of MPM candidates for the current block; determining the MPM candidate indicated by the decoded MPM index information out of the plurality of MPM candidates constituting the MPM candidate list as the intra prediction mode of the current block; and constructing a predicted block corresponding to the current block by performing intra prediction on the current block on the basis of the determined intra prediction mode. Here, the constructing the MPM candidate list includes determining a first MPM candidate corresponding to a reconstructed first block adjacent to the left side of the current block and a second MPM candidate corresponding to a reconstructed second block adjacent to the upper side of the current block, and setting at least one of the first MPM candidate and the second MPM candidate to a predetermined fixed position in the MPM candidate list.

The constructing the MPM candidate list may include determining the first MPM candidate to be the intra prediction mode of the first block and determining the second MPM candidate to be the intra prediction mode of the second block.

The constructing the MPM candidate list may include determining the first MPM candidate to be a DC mode when the first block is unavailable, and determining the second MPM candidate to be a DC mode when the second block is unavailable.

The constructing the MPM candidate list may include setting the first MPM candidate to a first position in the MPM candidate list and setting the second MPM candidate to a second position in the MPM candidate list when the first MPM candidate and the second MPM candidate are not equal to each other.

An index value of 0 may be allocated to the first MPM candidate set to the first position in the MPM candidate list and an index value of 1 may be allocated to the second MPM candidate set to the second position in the MPM candidate list.

The MPM candidate list may include three MPM candidates.

The constructing the MPM candidate list may include setting a planar mode as a third MPM candidate to a third position in the MPM candidate list when any of the first MPM candidate and the second MPM candidate is not a planar mode, setting a DC mode as the third MPM candidate to the third position in the MPM candidate list when one of the first MPM candidate and the second MPM candidate is a planar mode and any of the first MPM candidate and the second MPM candidate is not a DC mode, and setting a vertical mode as the third MPM candidate to the third position in the MPM candidate list when one of the first MPM candidate and the second MPM candidate is a planar mode and the other is a DC mode.

An index value of 2 may be allocated to the third MPM candidate set to the third position in the MPM candidate list.

According to another aspect of the present invention, there is provided a video decoder. The video decoder includes: an entropy decoding module that receives and decodes MPM index information indicating a most probable mode (MPM) candidate to be used as an intra prediction mode of a current block; an intra prediction mode determining module that constructs an MPM candidate list including a plurality of MPM candidates for the current block and that determines the MPM candidate indicated by the decoded MPM index information out of the plurality of MPM candidates constituting the MPM candidate list as the intra prediction mode of the current block; and a predicted block constructing module that constructs a predicted block corresponding to the current block by performing intra prediction on the current block on the basis of the determined intra prediction mode. Here, the intra prediction mode determining module determines a first MPM candidate corresponding to a reconstructed first block adjacent to the left side of the current block and a second MPM candidate corresponding to a reconstructed second block adjacent to the upper side of the current block, and sets at least one of the first MPM candidate and the second MPM candidate to a predetermined fixed position in the MPM candidate list.

The intra prediction mode determining module may determine the first MPM candidate to be the intra prediction mode of the first block and may determine the second MPM candidate to be the intra prediction mode of the second block.

The intra prediction mode determining module may determine the first MPM candidate to be a DC mode when the first block is unavailable and may determine the second MPM candidate to be a DC mode when the second block is unavailable.

The intra prediction mode determining module may set the first MPM candidate to a first position in the MPM candidate list and may set the second MPM candidate to a second position in the MPM candidate list when the first MPM candidate and the second MPM candidate are not equal to each other.

An index value of 0 may be allocated to the first MPM candidate set to the first position in the MPM candidate list and an index value of 1 may be allocated to the second MPM candidate set to the second position in the MPM candidate list.

The MPM candidate list may include three MPM candidates.

The intra prediction mode determining module may set a planar mode as a third MPM candidate to a third position in the MPM candidate list when any of the first MPM candidate and the second MPM candidate is not a planar mode, may set a DC mode as the third MPM candidate to the third position in the MPM candidate list when one of the first MPM candidate and the second MPM candidate is a planar mode and any of the first MPM candidate and the second MPM candidate is not a DC mode, and may set a vertical mode as the third MPM candidate to the third position in the MPM candidate list when one of the first MPM candidate and the second MPM candidate is a planar mode and the other is a DC mode.

An index value of 2 may be allocated to the third MPM candidate set to the third position in the MPM candidate list.

Advantageous Effects

By employing the video encoding method according to the present invention, it is possible to improve video encoding/decoding efficiency and to reduce complexity.

By employing the video decoding method according to the present invention, it is possible to improve video encoding/decoding efficiency and to reduce complexity.

By employing the intra prediction method according to the present invention, it is possible to improve video encoding/decoding efficiency and to reduce complexity.

By employing the video information transmitting method according to the present invention, it is possible to improve video encoding/decoding efficiency and to reduce complexity.

By employing the MPM candidate list constructing method according to the present invention, it is possible to improve video encoding/decoding efficiency and to reduce complexity.

DESCRIPTION OF EXEMPLARY EMBODIMENTS

Figure 1:
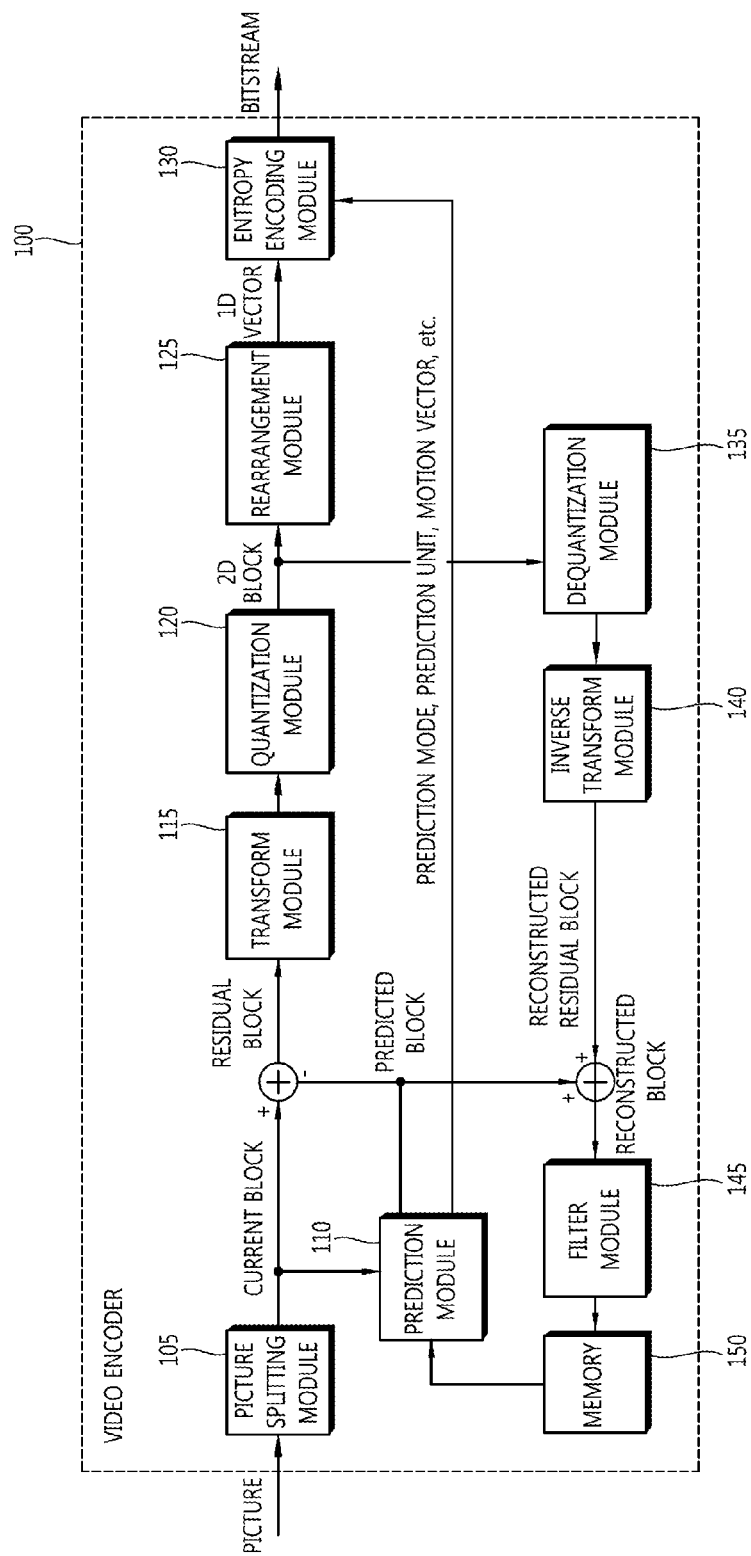
FIG. 1 is a block diagram schematically illustrating a video encoder according to an embodiment of the present invention.

The present invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in an image encoder and an image decoder, and do not mean that the elements are embodied by independent hardware or independent software. For example, two or more elements out of the elements may be combined to form a single element, or one element may be split into plural elements.

Embodiments in which the elements are combined and/or split belong to the scope of the invention without departing from the concept of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the present invention. Referring to FIG. 1, a video encoder 100 includes a picture splitting module 105, a prediction module 110, a transform module 115, a quantization module 120, a rearrangement module 125, an entropy encoding module 130, a dequantization module 135, an inverse transform module 140, a filter module 145, and a memory 150.

The picture splitting module 105 may split an input picture into at least one process unit block. Here, a block as the process unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction and an intra prediction module that performs an intra prediction. The prediction module 110 may perform a prediction on the process unit of a picture split by the picture splitting module 105 to construct a predicted block. The process unit of a picture in the prediction module 110 may be a CU, a TU, or a PU. The prediction module 110 may determine whether the prediction performed on the corresponding process unit is an inter prediction or an intra prediction, and may determine specific details (for example, a prediction mode) of the prediction methods may be determined. The process unit subjected to the prediction may be different from the process unit of which the prediction method and the specific details are determined. For example, the prediction method and the prediction mode may be determined in the units of CU or PU and the prediction may be performed in the units of TU.

In the inter prediction, a prediction may be performed on the basis of information on at least one of a previous picture and/or a subsequent picture of a current picture to construct a predicted block. In the intra prediction, a prediction may be performed on the basis of pixel information of a current picture to construct a predicted block.

A skip mode, a merge mode, a motion vector prediction (MVP), or the like may be used as the intra prediction method. In the inter prediction, a reference picture may be selected for a PU, and a reference block having the same size as the PU may be selected. The reference block may be selected in the unit of integer pixels. A predicted block may be constructed so that a residual signal from a current PU is minimized and the magnitude of a motion vector is minimized The predicted block may be constructed in the unit of integer pixel samples or in the unit of pixel samples less than an integer pixel, such as ½ pixel samples and ¼ pixel samples. Here, a motion vector may also be expressed in the unit of pixel samples less than an integer pixel. For example, lama pixels may be expressed in the unit of ¼ pixels and chroma pixels may be expressed in the unit of ⅛ pixels.

Information such as an index of a reference picture selected through the inter prediction, a motion vector (for example, a motion vector predictor), and a residual signal may be entropy-encoded and transmitted to a video decoder.

When the skip mode is used, the predicted block may be used as a reconstructed block and thus the residual signal may not be created, converted, quantized, and transmitted.

When the intra prediction is performed, a prediction mode may be determined in the unit of PUs and the prediction may be performed in the unit of PUs. Alternatively, a prediction mode may be determined in the unit of PUs and the intra prediction may be performed in the unit of TUs.

In the intra prediction, the prediction module 110 may determine an intra prediction mode of a PU and may perform a prediction on the basis of the determined intra prediction mode. The prediction modes in the intra prediction may include 33 directional prediction modes and at least two non-directional modes. The non-directional modes may include a DC prediction mode and a planar mode.

In the intra prediction, a predicted block may be constructed after a filter is applied to reference samples. At this time, it may be determined whether a filter should be applied to reference samples, depending on the intra prediction mode of a current block and/or the size of the current block Information on the intra prediction mode selected through the intra prediction may be entropy-encoded and transmitted to the video decoder.

A PU may be a block having various sizes/shapes. For example, in case of the inter prediction, a PU may be a 2N×2N block, a 2N×N block, a N×2N block, or a N×N block (where N is an integer). In case of the intra prediction, a PU may be a 2N×2N block or a N×N block (where N is an integer). The PU having a block size of N×N may be set to be used in only a specific case. For example, the PU having a block size of N×N may be set to be used for only a CU having the smallest size or may be set to be used for only the intra prediction. In addition to the above-mentioned sizes, PUs such as a N×mN block, a mN×N block, a 2N×mN block, and a mN×2N block (where m<1) may be additionally defined and used Residual values (a residual block or a residual signal) between the constructed predicted block and the original block may be input to the transform module 115. The prediction mode information, the motion vector information, and the like used for the prediction may be encoded along with the residual values by the entropy encoding module 130 and may be transmitted to the video decoder.

The transform module 115 may perform a transform operation on the residual block by transform units and created transform coefficients. The transform unit in the transform module 115 may be a TU and may have a quad tree structure. The size of the transform unit may be determined within a predetermined range of largest and smallest sizes. The transform module 115 may transform the residual block using a discrete cosine transform (DCT) and/or a discrete sine transform (DST).

The quantization module 120 may quantize the residual values transformed by the transform module 115 and may create quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the coefficient scanning order on the basis of stochastic statistics of the coefficients transmitted from the quantization module.

The entropy encoding module 130 may perform an entropy encoding operation on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, split unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

When the entropy encoding is performed, a low index value and a short codeword corresponding thereto may be allocated to a symbol of a high appearance frequency and a high index value and a long codeword corresponding thereto may be allocated to a symbol of a low appearance frequency. Therefore, it is possible to reduce an amount of bits for symbols to be encoded and to improve video compression performance by the entropy encoding.

The dequantization module 135 dequantizes the values quantized by the quantization module 120. The inverse transform module 140 inversely transforms the values dequantized by the dequantization module 135. The residual values created by the dequantization module 135 and the inverse transform module 140 may be merged with the predicted block predicted by the prediction module 110 to construct a reconstructed block.

FIG. 1 illustrates that the residual block and the predicted block are added by an adder to construct a reconstructed block. Here, the adder may be considered as a particular module (reconstructed block constructing module) that constructs a reconstructed block.

The filter module 145 may apply a deblocking filter, a sample adaptive offset (SAO), and/or an adaptive loop filter (ALF) to the reconstructed picture.

The deblocking filter may remove a block distortion generated at the boundary between blocks in the reconstructed picture. The SAO may reconstruct an offset difference of the residual block, which has been subjected to the deblocking filter, from the original video in the unit of pixels and may be applied in the form of a band offset and an edge offset. The ALF may perform a filtering on the basis of the resultant values of comparison of the original picture with the reconstructed picture of which the blocks have been filtered by the deblocking filter and/or the SAO. The ALF may be applied only when high efficiency is necessary.

On the other hand, the filter module 145 may not perform a filtering on the reconstructed block used in the inter prediction.

The memory 150 may store the reconstructed block or picture calculated by the filter module 145. The reconstructed block or picture stored in the memory 150 may be supplied to the prediction module 110 that performs the inter prediction.

Figure 2:
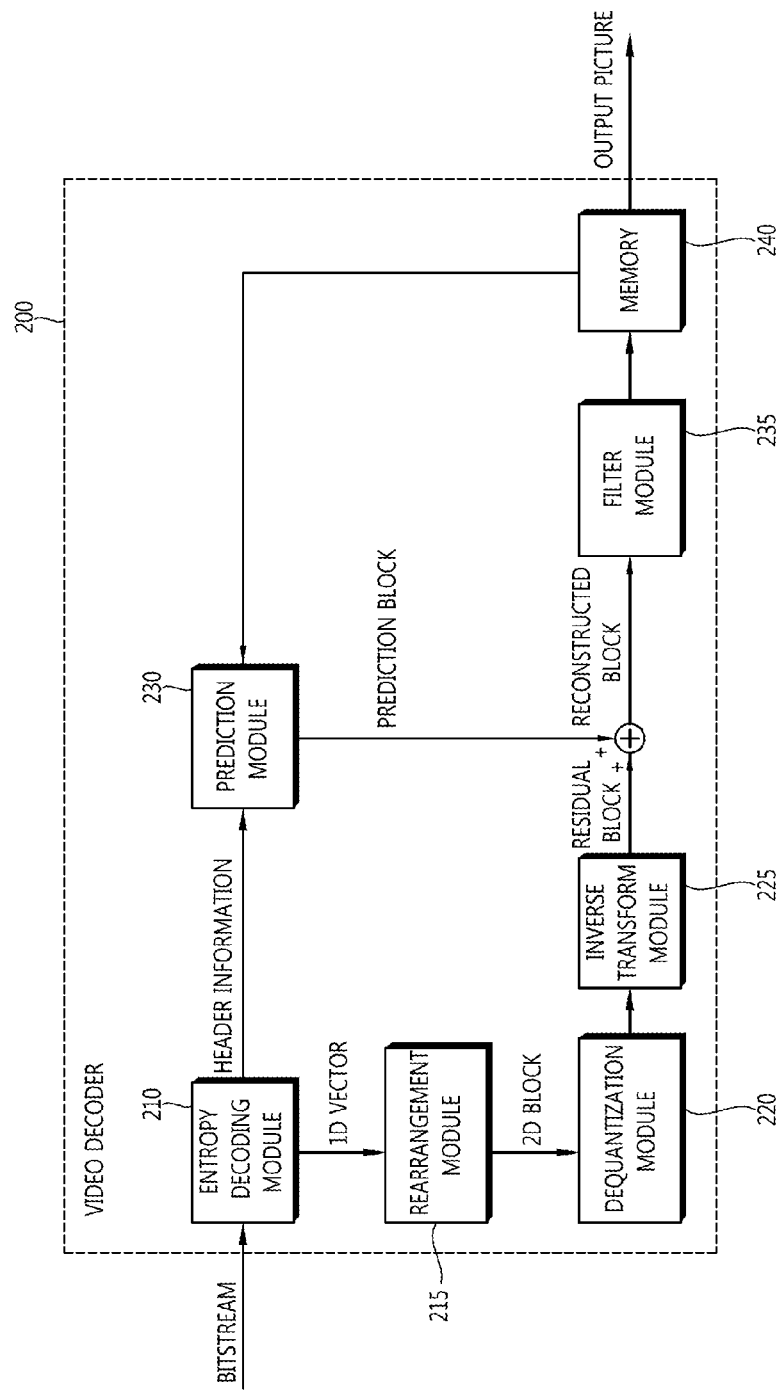
FIG. 2 is a block diagram schematically illustrating a video decoder according to an embodiment of the present invention.

FIG. 2 is a block diagram schematically illustrating a video decoder according to an embodiment of the present invention. Referring to FIG. 2, a video decoder 200 may include an entropy decoding module 210, a rearrangement module 215, a dequantization module 220, an inverse transform module 225, a prediction module 230, a filter module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 210 may implement the same VLC table as the VLC table used in the video encoder and may perform the entropy decoding operation. When the video encoder uses the CABAC method to perform the entropy encoding process, the entropy decoding module 210 may perform the entropy decoding operation using the CABAC method to correspond thereto.

Information for constructing a predicted block out of the information decoded by the entropy decoding module 210 may be supplied to the prediction module 230, and the residual values entropy-decoded by the entropy decoding module 210 may be input to the rearrangement module 215.

The rearrangement module 215 may rearrange the bitstream entropy-decoded by the entropy decoding module 210 on the basis of the rearrangement method in the video encoder. The rearrangement module 215 may reconstruct and rearrange coefficients expressed in the form of a one-dimensional vector into coefficients in the form of a two-dimensional block. The rearrangement module 215 may be supplied with information associated with the coefficient scanning performed by the video encoder and may perform the rearrangement using a method of inversely scanning the coefficients on the basis of the scanning order in which the scanning is performed by the video encoder.

The dequantization module 220 may perform dequantization on the basis of the quantization parameters supplied from the video encoder and the coefficient values of the rearranged block The inverse transform module 225 may perform the inverse DCT and/or inverse DST of the DCT and/or DST, which has been performed by the transform module of the video encoder, on the quantization result from the video encoder. The inverse transform may be performed on the basis of a transfer unit or a split unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 may construct a predicted block on the basis of prediction block construction information supplied from the entropy decoding module 210 and the previously-decoded block and/or picture information supplied from the memory 240.

When the prediction mode of a current CU and/or PU is an intra prediction mode, the prediction module 230 may perform an intra prediction of constructing a predicted block on the basis of pixel information of a current picture. At this time, the prediction module 230 may determine an intra prediction mode of the PU and may perform the prediction on the basis of the determined intra prediction mode. Here, when intra prediction mode-relevant information received from the video encoder is confirmed, the intra prediction mode may be induced to correspond to the intra prediction mode-relevant information.

When the prediction mode for a current CU and/or PU is the inter prediction mode, the prediction module 230 may perform the inter prediction on the current PU on the basis of information included in at least one of a previous picture and a subsequent picture of the current picture. At this time, motion information for the inter prediction of the current PU, for example, information on motion vectors and reference picture indices, supplied from the video encoder may be induced from a skip flag, a merge flag, and the like received from the video encoder.

The reconstructed block may be constructed using the predicted block constructed by the prediction module 230 and the residual block supplied from the inverse transform module 225. FIG. 2 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filter module 235. The filter module 235 may perform a deblocking filtering, an SAO operation, and/or an ALF operation on the reconstructed block and/or picture.

The memory 240 may store the reconstructed picture or block for use as a reference picture or a reference block and may supply the reconstructed picture to an output module.

In the below description, a current block may be a block which is currently subjected to encoding, decoding, and/or predictions and may be a block corresponding to a process unit when the encoding, decoding, and/or predictions are performed. For example, when a prediction is performed on a current block, the current block may be a prediction target block corresponding to a current prediction unit. In the below description, a block constructed through the prediction is referred to as a predicted block A "unit" means a process unit when encoding, decoding, and/or predictions are performed and may be distinguished from a "block" indicating a set of pixels and/or samples. In the below description, for the purpose of convenience of explanation, a "unit" may mean a "block" corresponding to the "unit". For example, in the below description, a prediction target block corresponding to one prediction unit may be referred to as a prediction unit, an encoding/decoding target block corresponding one encoding unit may be referred to as a coding unit. This distinction will be apparent to those skilled in the art.

Figure 3:
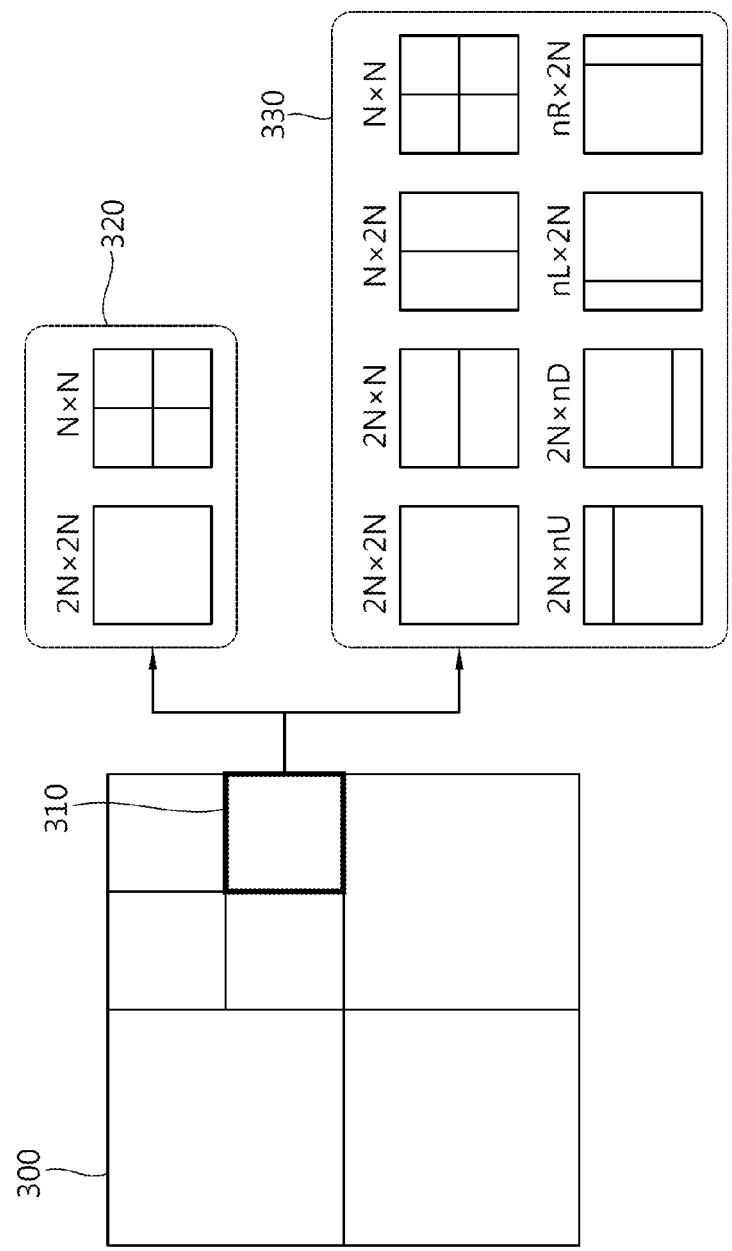
FIG. 3 is a diagram schematically illustrating an example of a quad tree structure of process units in a system to which the present invention is applied.

FIG. 3 is a diagram schematically illustrating an example of a quad tree structure of process units in a system to which the present invention is applied.

A coding unit (CU) may mean a unit in which a picture is subjected to encoding/decoding. One coding block in a coding target picture may have a depth based on a quad tree structure and may be repeatedly partitioned. A coding block which is not partitioned any more may be the coding unit, and the video encoder may perform an encoding operation on the coding unit. The coding unit may have various sizes such as 64×64. 32×32. 16×16, and 8×8.

Here, a coding block repeatedly partitioned on the basis of a quad tree structure may be referred to as a coding tree block (CTB). One coding tree block may not be additionally partitioned. In this case, the coding tree block itself may be one coding unit. Therefore, the coding tree block may correspond to a largest coding unit (LCU) which is a coding unit having the largest size. On the other hand, a coding unit having the smallest size in the coding tree block may be referred to as a smallest coding unit (SCU).

Referring to FIG. 3, the coding tree block 300 may have a hierarchical structure including smaller coding units 310 through the partitioning and the hierarchical structure of the coding tree block 300 may be specified on the basis of size information, depth information, partition flag information, and the like. The size information, the partition depth information, and the partition flag information of a coding tree block may be transmitted from the video encoder to the video decoder in a state where they are included in a sequence parameter set (SPS) in a bit stream.

On the other hand, it may be determined in the units of coding units which of the inter prediction and the intra prediction should be performed. When the inter prediction is performed, an inter prediction mode and motion information may be determined by prediction units. When the intra prediction is performed, an intra prediction mode may be determined by prediction units. At this time, as described above, the process unit by which the prediction is performed and the process unit by which the prediction method and the specific details are determined may be equal to or different from each other. For example, the prediction method and the prediction mode may be determined in the unit of prediction units and the prediction may be performed in the unit of transform units.

Referring to FIG. 3, one coding unit 310 may be used as one prediction unit or may be partitioned into plural prediction units. In case of intra prediction 320, a partitioning mode of a coding unit (and/or a prediction unit) may be 2N×2N or N×N (where N is an integer). In case of inter prediction 330, a partitioning mode of a coding unit (and/or a prediction unit) may be 2N×2N, 2N×N, N×2N, N×N, 2N×nU, 2N×nD, nL×2N, or nR×2N (where N is an integer). The partitioning mode is an example and the method of partitioning a coding unit into prediction units is not limited to the example. For example, only four types of 2N×2N, 2N×N, N×2N, N×N may be used as a partitioning mode of a coding unit (and/or a prediction unit) in the inter prediction 330, or another partitioning mode in addition to the eight types of partitioning modes may be additionally used.

On the other hand, as described above with reference to FIGS. 1 and 2, in case of the intra mode, the prediction module may perform a prediction on the basis of pixel information in a reconstructed region of a current picture and may construct a predicted block of the current block. For example, the prediction module may predict pixel values in the current block using pixels in reconstructed blocks located on the upper side, the left side, the left-upper side, and/or the right-upper side of the current block.

Figure 4:
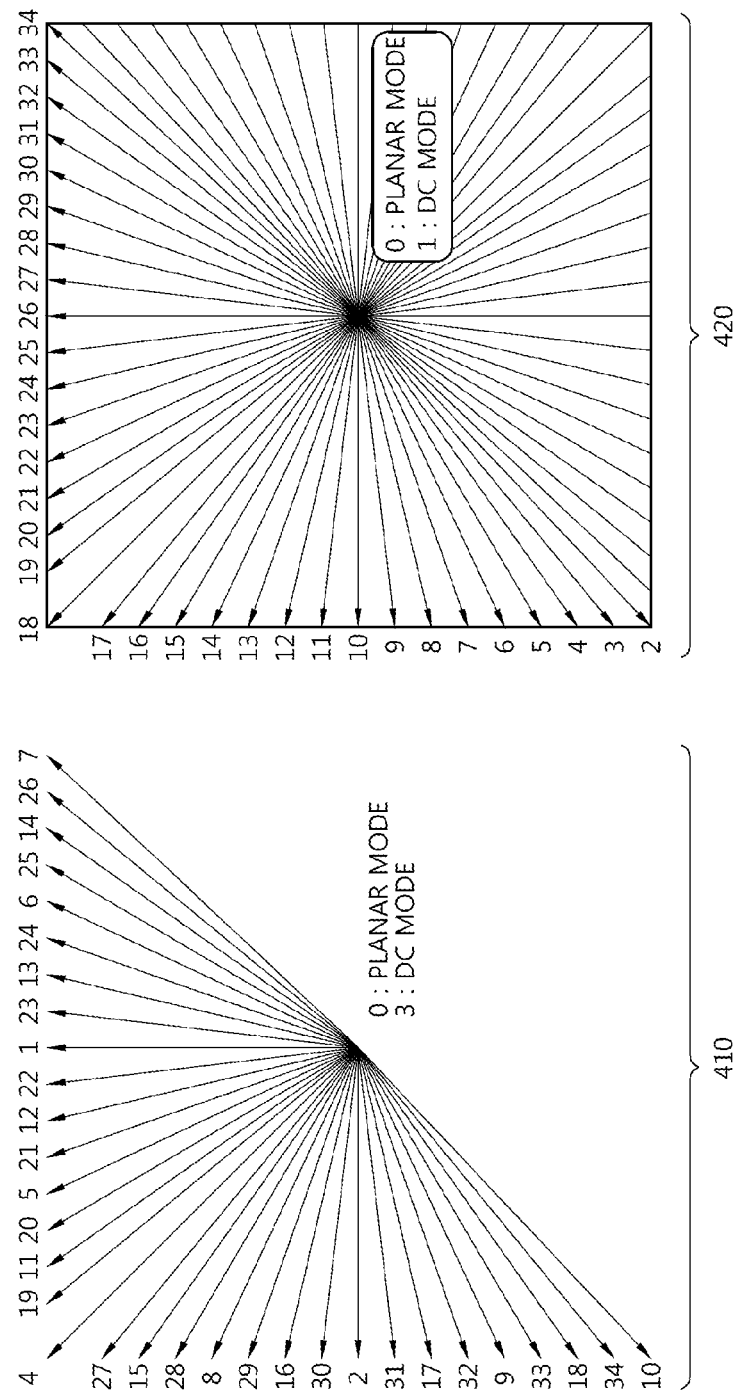
FIG. 4 is a diagram schematically illustrating examples of prediction directions of intra prediction modes used for intra prediction and prediction mode numbers allocated to the prediction directions.

FIG. 4 is a diagram schematically illustrating examples of prediction directions of intra prediction modes used for the intra prediction and prediction mode numbers allocated to the prediction directions.

The intra prediction may be performed on the basis of the intra prediction mode of the current block. The respective intra prediction modes used for the intra prediction may have a predetermined angle and/or a prediction direction and a predetermined prediction mode number may be allocated to each intra prediction mode. Examples of the intra prediction mode may include angular modes including a vertical mode and a horizontal mode, a DC mode, and a planar mode depending on positions and/or prediction methods of reference pixels used to predict pixel values of the current block.

For example, referring to 410 in FIG. 4, the prediction mode number allocated to the planar mode may be 0 and the prediction mode number allocated to the DC mode may be 3. The prediction mode number allocated to the vertical mode may be 1 and the prediction mode number allocated to the horizontal mode may be 2. The other prediction mode numbers may be respectively allocated to the angular modes other than the vertical mode and the horizontal mode depending on the angles and/or the prediction directions of the intra prediction modes.

For example, referring to 420 in FIG. 4, the prediction mode number allocated to the planar mode may be 0 and the prediction mode number allocated to the DC mode may be 1. The prediction mode number allocated to the vertical mode may be 26 and the prediction mode number allocated to the horizontal mode may be 10. The other prediction mode numbers may be respectively allocated to the angular modes other than the vertical mode and the horizontal mode depending on the angles and/or the prediction directions of the intra prediction modes.

In the vertical mode, a prediction is performed in the vertical direction using pixel values in blocks adjacent to the current block In the horizontal mode, a prediction is performed in the horizontal direction using pixel values in blocks adjacent to the current block. In the DC mode, a fixed value may be used as a predicted value of pixels in the current block. Here, for example, the fixed value may be derived by averaging the neighboring pixel values of the current block. In the planar mode, predicted values of prediction target pixels located in the current block may be derived through a predetermined cacluating on the basis of the pixel values of plural neighboring pixels of the current block. At this time, plural pixels used to predict the prediction target pixels may be determined differently depending on the positions of the prediction target pixels. In the other angular modes other than the vertical mode and the horizontal mode, the prediction may be performed depending on the angle and/or the direction determined in advance for each mode.

The prediction module may use the predetermined prediction directions and the predetermined prediction mode numbers as illustrated in 410 and 420 of FIG. 4. For example, the number of intra prediction modes which can be used for the current block may vary depending on the size of the current block. For example, the number of intra prediction modes which can be used for the current block may be a predetermined fixed value. For example, the number of intra prediction modes which can be used for the current block may be 35. The 35 intra prediction modes may include the planar mode, the DC mode, and the angular modes (where the angular modes may include the vertical mode and the horizontal mode).

The prediction directions of the intra prediction modes and the prediction mode numbers allocated to the intra prediction modes are not limited to the above-mentioned example, and may be determined to be different from 410 and 420 of FIG. 4 if necessary. In the below description, for the purpose of convenience of explanation, it is assumed that the intra prediction is performed on the basis of the intra prediction modes having the prediction directions and the prediction mode numbers illustrated in 410 of FIG. 4, as long as it is mentioned differently. However, the present invention is not limited to this assumption, and the intra prediction modes illustrated in 420 of FIG. 4 or the identical or similar methods may be applied when the prediction directions and the prediction mode numbers are determined in different ways.

In the below description, the prediction mode number may be referred to as a mode number or a mode value for the purpose of convenience of explanation.

As described above, after determining an intra prediction mode, the video encoder may encode information on the determined intra prediction mode and may transmit the encoded information to the video decoder. The information on the intra prediction mode may be transmitted as a value itself indicating the prediction mode, or a method of transmitting intra prediction mode information on the basis of the mode value predicted for the intra prediction mode may be used so as to improve transmission efficiency. In the below description, a prediction mode used as a predicted value of an intra prediction mode of a current block is referred to as a most probable mode (MPM).

Figure 5:
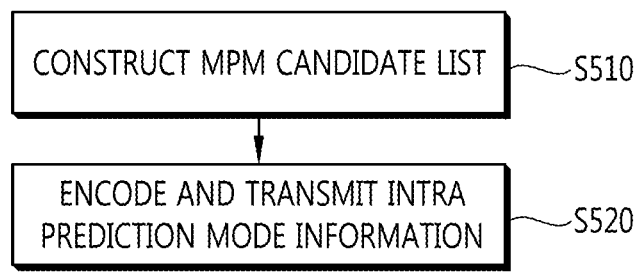
FIG. 5 is a flowchart schematically illustrating an example of an intra prediction mode information transmitting method according to the present invention.

FIG. 5 is a flowchart schematically illustrating an example of an intra prediction mode information transmitting method according to the present invention.

Referring to FIG. 5, the video encoder may construct an MPM candidate list (S510). The process of constructing the MPM candidate list may be performed by the prediction module of the video encoder illustrated in FIG. 1.

The MPM candidate list may include plural MPM candidates. That is, the video encoder may derive plural MPM candidates on the basis of the intra prediction modes of plural neighboring blocks adjacent to the current block and may allocate the MPM candidates to the MPM candidate list. At this time, the video encoder may use the intra prediction modes of the neighboring blocks themselves as the MPM candidates corresponding to the neighboring blocks, or may use particular intra prediction modes determined depending on a predetermined condition as the MPM candidates corresponding to the neighboring blocks.

For example, the current block and the neighboring blocks may be blocks corresponding to a PU.

MPM index values may be allocated to the plural MPM candidates constituting the MPM candidate list. For example, an index value of 0 may be allocated to a first MPM candidate in the MPM candidate list. An index value of 1 may be allocated to a second MPM candidate in the MPM candidate list. Similarly, an index value of n−1 may be allocated to an n-th MPM candidate (where n is a natural number) in the MPM candidate list.

Here, the "n-th MPM candidate" may be an MPM candidate located at the n-th position in the MPM candidate list or may be an MPM candidate allocated in the n-th order to the MPM candidate list. Therefore, a relatively-small index value may be considered to be allocated to an MPM candidate located relatively ahead in the MPM candidate list or an MPM candidate relatively early allocated to the MPM candidate list. For example, an index value of 0 may be allocated to the first MPM candidate and a largest index value may be allocated to the final MPM candidate. In the below description, an MPM candidate to which an index value of n−1 is allocated out of the MPM candidates constituting the MPM candidate list is referred to as an n-th MPM candidate (where n is a natural number) for the purpose of convenience of explanation.

On the other hand, in order to guarantee parsing robustness when deriving the MPM candidate list, the video encoder may determine that the number of MPM candidates included in the MPM candidate list is fixed. That is, the video encoder may use a predetermined fixed number of MPM candidates to encode the intra prediction modes. For example, the number of MPM candidates constituting the MPM candidate list may be fixed to 2. For example, the number of MPM candidates constituting the MPM candidate list may be fixed to 3.

When the number of MPM candidates included in the MPM candidate list is fixed, the number of MPM candidates derived to correspond to the neighboring blocks may be smaller than the fixed number. For example, it is assumed that the number of MPM candidates included in the MPM candidate list is fixed to 3 and two neighboring blocks are used to induce the MPM candidates. At this time, the number of MPM candidates derived to correspond to the neighboring blocks may be 2. When the intra prediction modes of the two neighboring blocks are equal to each other, the number of MPM candidates induced to correspond to the neighboring blocks may be 1. In this case, the video encoder may determine an additional MPM candidate and may allocate the determined additional MPM candidate to the MPM candidate list. Here, the additionally-induced MPM candidate may be selected from the intra prediction modes other than the MPM candidates induced to correspond to the neighboring blocks.

Specific examples of the method of determining MPM candidates and the method of allocating the MPM candidates to the MPM candidate list will be described later.

Referring to FIG. 5 again, the video encoder may generate information on the intra prediction modes on the basis of the MPM candidate list and may encode and transmit the information to the video decoder (S520). The process of generating the information on the intra prediction modes may be performed, for example, by the prediction module of the video encoder described with reference to FIG. 1. The process of encoding and transmitting the intra prediction mode information may be performed, for example, by the entropy encoding module of the video encoder described with reference to FIG. 1.

The video encoder may generate MPM flag information by determining whether an MPM candidate to be used as the intra prediction mode of the current block is present in the plural MPM candidates constituting the MPM candidate list, that is, whether the predicted value of the intra prediction mode is used as the intra prediction mode of the current block. Here, the MPM flag may be a flag specifying whether an MPM candidate to be used as the intra prediction mode of the current block is present in the plural MPM candidates constituting the MPM candidate list. For example, the MPM flag may be expressed by a syntax element of prev_intra_luma_pred_flag. The generated MPM flag information may be encoded by the entropy encoding module of the video encoder and may be transmitted to the video decoder.

When an MPM candidate to be used as the intra prediction mode of the current block is present in the MPM candidate list, the video encoder may generate MPM index information indicating an MPM candidate to be used as the intra prediction mode of the current block out of the plural MPM candidates constituting the MPM candidate list. For example, the MPM index information may indicate an index value allocated to the MPM candidate to be used as the intra prediction mode of the current block. The MPM index information may be expressed, for example, by a syntax element mpm_idx. The generated MPM index information may be encoded by the entropy encoding module of the video encoder and may be transmitted to the video decoder.

When an MPM candidate to be used as the intra prediction mode of the current block is not present in the MPM candidate list, the video encoder may derive a remaining mode corresponding to the intra prediction mode of the current block on the basis of the plural MPM candidates constituting the MPM candidate list and the intra prediction mode of the current block For example, the mode value of the remaining mode may be a value obtained by subtracting the number of MPM candidates having a mode value smaller than that of the intra prediction mode of the current block from the mode value of the intra prediction mode of the current block. The remaining mode may be expressed, for example, by a syntax element of rem_intra_luma_pred_mode. The induced remaining mode may be encoded by the entropy encoding module of the video encoder and may be transmitted to the video decoder.

FIG. 5 schematically illustrates operations of the video encoder so as to easily understand the present invention in consideration of details relevant to the intra prediction mode, but this is for convenience of explanation and the operations of the video encoder in the present invention may include all the operations described with reference to FIG. 1.

Figure 6:
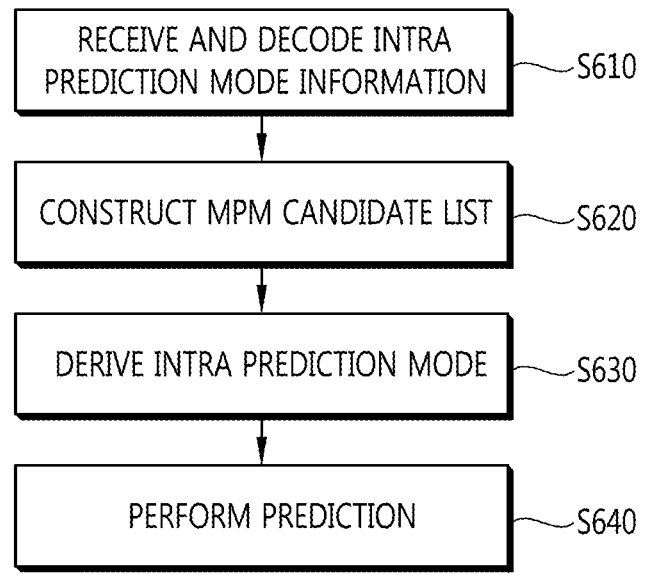
FIG. 6 is a flowchart schematically illustrating an example of an intra prediction method according to the present invention.

FIG. 6 is a flowchart schematically illustrating an example of an intra prediction method according to the present invention.

Referring to FIG. 6, the video decoder may receive intra prediction mode information from the video encoder and may decode the received information (S610). The decoding process may be performed, for example, by the entropy decoding module of the video decoder described with reference to FIG. 2. The intra prediction mode information received from the video encoder may include MPM flag information, MPM index information, and/or remaining mode information.

Referring to FIG. 6, the video decoder may construct an MPM candidate list (S620).

The video decoder may derive MPM candidates in the same method as in the video encoder and may construct the MPM candidate list. The process of constructing the MPM candidate list may be performed by the prediction module of the video decoder illustrated in FIG. 2.

The MPM candidate list may include plural MPM candidates. That is, the video decoder may induce plural MPM candidates on the basis of the intra prediction modes of plural neighboring blocks adjacent to the current block and may allocate the MPM candidates to the MPM candidate list. At this time, the video decoder may use the intra prediction modes of the neighboring blocks themselves as the MPM candidates corresponding to the peripheral blocks, or may use particular intra prediction modes determined depending on a predetermined condition as the MPM candidates corresponding to the neighboring blocks. For example, the current block and the neighboring blocks may be blocks corresponding to a PU.

Specific details relevant to construction of the MPM candidate list are the same as those of the process of constructing the MPM candidate list in the video encoder described with reference to FIG. 5, and thus specific description thereof will not be repeated. Specific examples of the method of determining MPM candidates and the method of allocating the MPM candidates to the MPM candidate list will be described later.

Referring to FIG. 6 again, the video decode may derive the intra prediction mode of the current block on the basis of the MPM candidate list and the intra prediction mode information (S630). The process of inducing the intra prediction mode may be performed, for example, by the prediction module of the video decoder described with reference to FIG. 2.

The video decoder may determine whether an MPM candidate to be used as the intra prediction mode of the current block is present in the plural MPM candidates constituting the MPM candidate list on the basis of the MPM flag information received from the video encoder. The MPM flag information is described above with reference to FIG. 5 and thus specific description thereof will not be repeated.

When an MPM candidate to be used as the intra prediction mode of the current block is present in the MPM candidate list, the video decoder may determine the MPM candidate indicated by the MPM index information to be the intra prediction mode of the current block. The MPM index information is described above with reference to FIG. 5 and thus specific description thereof will not be repeated.

When an MPM candidate to be used as the intra prediction mode of the current block is not present in the MPM candidate list, the video decoder may derive the intra prediction mode of the current block on the basis of the MPM candidate list and the remaining mode received from the video encoder. For example, it is assumed that the number of MPM candidates constituting the MPM candidate list is N (where N is a natural number) and the mode values of the MPM candidates are mode1, mode2, modeN. Further, it is assumed when X is smaller, then the smaller value is allotted to modeX. When X is in a range of 1 to N−1 and the mode value of the remaining mode is equal to or greater than modeX−(X−1) and smaller than mode(X+1)−X, the intra prediction mode value of the current block may be determined to be a value obtained by adding X to the mode value of the remaining mode. When X is equal to N and the mode value of the remaining mode is equal to or greater than modeN−(N−1), the intra prediction mode value of the current block may be determined to be a value obtained by adding N to the mode value of the remaining mode.

Referring to FIG. 6 again, the video decoder may construct a predicted block corresponding to the current block by performing the intra prediction on the current block on the basis of the intra prediction mode of the current block (S640).

FIG. 6 schematically illustrates operations of the video decoder so as to easily understand the present invention in consideration of details relevant to the intra prediction mode, but this is for convenience of explanation and the operations of the video decoder in the present invention may include all the operations described with reference to FIG. 2.

Figure 7:
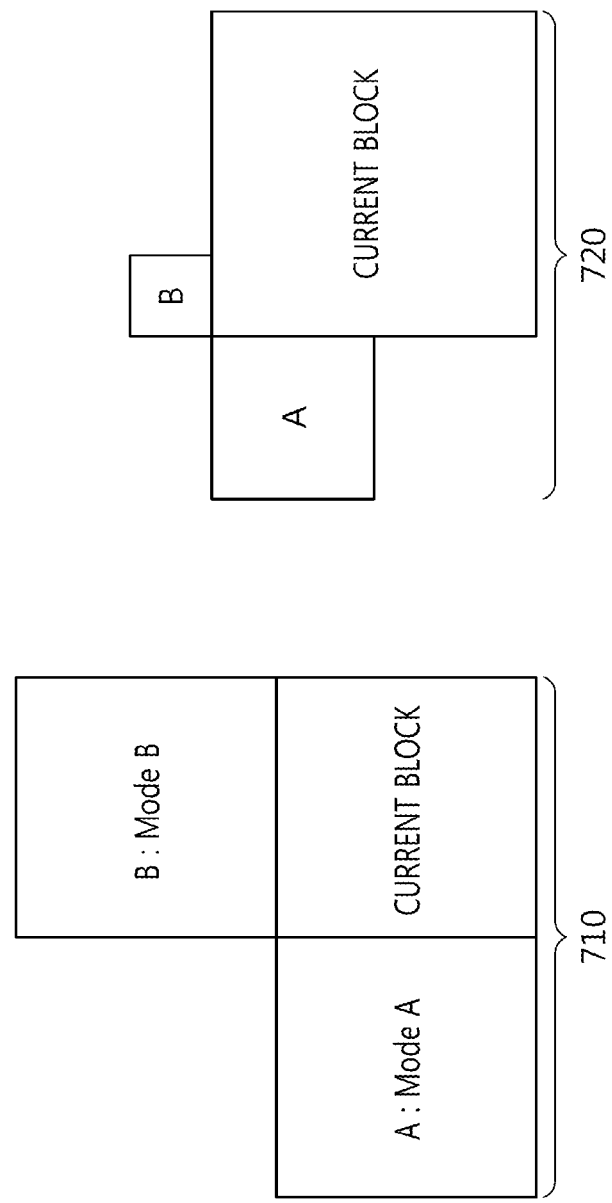
FIG. 7 is a diagram illustrating an example of a procedure of determining MPM candidates and constructing an MPM candidate list.

FIG. 7 is a diagram illustrating an example of the process of determining MPM candidates and constructing an MPM candidate list.

As described above, the prediction modules of the video encoder and the video decoder may derive plural MPM candidates on the basis of the intra prediction modes of the plural neighboring blocks adjacent to the current block and may allocate the MPM candidates to the MPM candidate list.

710 of FIG. 7 illustrates an example of neighboring blocks used to derive MPM candidates.

Referring to 710 of FIG. 7, a left neighboring block (block A) adjacent to the left side of the current block and an upper neighboring block (block B) adjacent to the upper side of the current block may be used to derive the MPM candidates. Here, the current block may be a block to be currently predicted and may be a block corresponding to a PU. Block A and block B may be blocks corresponding to a PU.

720 of FIG. 7 illustrates another example of neighboring blocks used to induce MPM candidates.

The current block and block A and block B used to derive the MPM candidates may have the same size as illustrated in 710 of FIG. 7, but may have different sizes. For example, as illustrated in 720 of FIG. 7, the sizes of blocks adjacent to the left side and/or the upper side of the current block may be different from the size of current block. In this case, the number of blocks located adjacent to the left side and/or the upper side of the current block may be one or more.

Referring to 720 of FIG. 7, a block (block A) located at the uppermost position of the blocks adjacent to the left side of the current block and a block (block B) located at the leftmost position of bocks adjacent to the upper side of the current block may be used to derive the MPM candidates. Here, the current block may be a block to be currently predicted and may be a block corresponding to a PU. Block A and block B may be blocks corresponding to a PU.

In 710 and 720 of FIG. 7, block A and block B may be specified as positions of pixels belonging to block A and pixels belonging to block B. The positions of the pixels belonging to block A and the positions of the pixels belonging to block B may be determined, for example, as positions relative to the leftmost-upper pixel in the current block For example, the position of the leftmost-upper pixel in the current block is assumed to be (xB, yB). At this time, block A may be specified as the position of the pixel corresponding to (xB−1, yB) and block B may be specified as the position of the pixel corresponding to (xB, yB−1).

In the below examples, as in 710 and 720 of FIG. 7, the process of deriving MPM candidates on the basis of a block adjacent to the left side of the current block and a block adjacent to the upper side of the current block and constructing an MPM candidate list will be described. In the below description, a block adjacent to the left side of the current block is referred to as "block A" and a block adjacent to the upper side of the current block is referred to as "block B", for the purpose of convenience of explanation. In the example illustrated in FIG. 7, block A and block B may be referred to as neighboring blocks in some cases.

The block subjected to the encoding/decoding process using the intra mode out of block A and block B may have an intra prediction mode. In the below description, the intra prediction mode of the block A is referred to as "mode A" and the intra prediction mode of block B is referred to as "mode B", for the purpose of convenience of explanation.

The MPM candidates of the current block may be derived on the basis of mode A which is the intra prediction mode of block A and mode B which is the intra prediction mode of block B. At this time, the prediction module may determine the MPM candidate corresponding to block A and the MPM candidate corresponding to block B, and may determine an additional MPM candidate if necessary.

For example, the MPM candidate derived to correspond to block A may be an intra prediction mode of block A, and the MPM candidate derived to correspond to block B may be an intra prediction mode of block B. However, the MPM candidate corresponding to block A may be determined to be a predetermined intra prediction mode other than the intra prediction mode of block A, and the MPM candidate corresponding to block B may be determined to be a predetermined intra prediction mode other than the intra prediction mode of block B.

In the below description, the MPM candidate derived to correspond to block A is referred to as "MPM candidate A" and the MPM candidate derived to correspond to block B is referred to as "MPM candidate B".

For example, in FIG. 7, MPM candidate A may be determined to be mode A and MPM candidate B may be determined to be mode B. When mode A and mode B are equal to each other, the number of MPM candidates allocated to the MPM candidate list may be one. In this case, one MPM candidate may be used as a predicted value of the intra prediction mode of the current block. When mode A and mode B are not equal to each other, the number of MPM candidates allocated to the MPM candidate list may be two. In this case, the video encoder may encode MPM index information indicating the MPM candidate to be used as the intra prediction mode of the current block and may transmit the encoded information to the video decoder. The video decoder may determine whether the MPM candidate to be used as the intra prediction mode of the current block is mode A or mode B.

On the other hand, as described above, in order to guarantee parsing robustness when deriving the MPM candidate list, the prediction module may determine the number of MPM candidates to be constant. That is, the prediction module may use a predetermined fixed number of MPM candidates to encode/decode the intra prediction mode. For example, the number of MPM candidates constituting the MPM candidate list may be fixed to 2. For example, the number of MPM candidates constituting the MPM candidate list may be fixed to 3.

Examples of the method of inducing the MPM candidates and constructing the MPM candidate list when the number of MPM candidates constituting the MPM candidate list is fixed to 2 will be described below.

In an example, when both of mode A and mode B are unavailable, the prediction module may determine the first MPM candidate allocated to the MPM candidate list to be the planar mode (for example, the mode value of the planar mode may be 0 when the prediction mode number is allocated as in 410 of FIG. 4), and may determine the second MPM candidate allocated to the MPM candidate list to be the DC mode (for example, the mode value of the DC mode may be 3 when the prediction mode number is allocated as in 410 of FIG. 4). Here, for example, the prediction module may allocate MPM candidate A and MPM candidate B to the MPM candidate list after determining MPM candidate A to be the planar mode and determining MPM candidate B to be the DC mode. In another example, the prediction module may determine that any of MPM candidate A and MPM candidate B is not available and may allocate the planar mode and the DC mode as additional MPM candidates to the MPM candidate list.

The case where mode A and mode B are unavailable may include a case where the neighboring blocks are located outside the current picture and/or the current slice and a case where the prediction modes of the neighboring blocks are not intra prediction modes.

When only one of mode A and mode B is available, the prediction module may determine the MPM candidate corresponding to the neighboring block having the unavailable mode to be the planar mode, or may determine that the MPM candidate corresponding to the neighboring block having the unavailable mode is not available and may determine the planar mode as the additional MPM candidate. At this time, for example, the prediction module may allocate the planar mode as the first MPM candidate to the MPM candidate list and may allocate the available intra prediction mode out of mode A and mode B as the second MPM candidate to the MPM candidate list. Here, when the available intra prediction mode of mode A and mode B is the planar mode, the DC mode may be allocated as the second MPM candidate to the MPM candidate list so as to avoid redundancy.

When both of mode A and mode B are available and mode A and mode B are equal to each other, the prediction module may determine the planar mode as an additional MPM candidate. When both of mode A and mode B are available, mode A may be determined to be MPM candidate A and mode B may be determined as MPM candidate B. Since mode A and mode B are equal to each other, MPM candidate A and MPM candidate B may be equal to each other.

At this time, for example, the prediction module may allocate the planar mode as the first MPM candidate to the MPM candidate list, and may allocate mode A (and/or MPM candidate A) and/or mode B (and/or MPM candidate B) as the second MPM candidate to the MPM candidate list. Here, when mode A (and/or MPM candidate A) and/or mode B (and/or MPM candidate B) are the planar mode, the DC mode may be allocated as the second MPM candidate to the MPM candidate list so as to avoid redundancy.

When both of mode A and mode B are available and mode A and mode B are different from each other, the prediction module may allocate mode A and mode B as the MPM candidates to the MPM candidate list. When both of mode A and mode B are available as described above, mode A may be determined to be MPM candidate A and mode B may be determined to be MPM candidate B. At this time, for example, the intra prediction mode having the smaller mode value out of mode A (and/or MPM candidate A) and/or mode B (and/or MPM candidate B) may be determined as the first MPM candidate and the intra prediction mode having the larger mode value out of mode A (and/or MPM candidate A) and/or mode B (and/or MPM candidate B) may be determined as the second MPM candidate.

In another example, when both of mode A and mode B are available and mode A and mode B are different from each other, the prediction module may allocate mode A (and/or MPM candidate A) and/or mode B (and/or MPM candidate B) to predetermined fixed positions in the MPM candidate list. That is, when mode A and mode B are used as the MPM candidates, the MPM index values allocated to mode A (and/or MPM candidate A) and/or mode B (and/or MPM candidate B) may be predetermined fixed values. For example, the prediction module may allocate mode A (and/or MPM candidate A) as the first MPM candidate to the MPM candidate list and may allocate mode B (and/or MPM candidate B) as the second MPM candidate to the MPM candidate list. In this case, an index value of 0 may be allocated to mode A (and/or MPM candidate A) and an index value of 1 may be allocated to mode B (and/or MPM candidate B). In another example, the prediction module may allocate mode B (and/or MPM candidate B) as the first MPM candidate to the MPM candidate list and may allocate mode A (and/or MPM candidate A) as the second MPM candidate to the MPM candidate list. In this case, an index value of 0 may be allocated to mode B (and/or MPM candidate B) and an index value of 1 may be allocated to mode A (and/or MPM candidate A).

When mode A (and/or MPM candidate A) and/or mode B (and/or MPM candidate B) are allocated to predetermined fixed positions in the MPM candidate list, the computational load of the video encoder and the video decoder may be reduced in comparison with a case where the intra prediction mode having the smaller mode value out of mode A (and/or MPM candidate A) and/or mode B (and/or MPM candidate B) is determined to be the first MPM candidate. This is because a computing operation of comparing the mode value of mode A (and/or MPM candidate A) and/or the mode value of mode B (and/or MPM candidate B) can be removed.

In another example, the prediction module may fix the first MPM candidate to the planar mode when deriving the MPM candidate list of which the number of MPM candidates is fixed to 2. That is, the first MPM candidate allocated to the MPM candidate list may be always determined to be the planar mode. At this time, the MPM index value allocated to the planar mode as the first MPM candidate may be 0.

At this time, for example, the prediction module may allocate mode A as the second MPM candidate to the MPM candidate list. When mode A is unavailable or is the planar mode, the prediction module may allocate mode B as the second MPM candidate to the MPM candidate list. When mode B is also unavailable or is the planar mode, the DC mode may be allocated as the second MPM candidate to the MPM candidate list. An MPM index value of 1 may be allocated to the intra prediction mode allocated as the second MPM candidate. In this case, in comparison with the above-mentioned examples, the appearance frequency of the process of checking availability of mode B may be reduced. Since the mode value of the mode A and the mode value of mode B do not need to be compared, it is possible to complexity in the video encoder and the video decoder.

In another example, when the first MPM candidate is fixed to the planar mode, the prediction module may allocate mode A as the second MPM candidate to the MPM candidate list. In this case, when mode A is unavailable or is the planar mode, the prediction module may allocate the DC mode as the second MPM candidate to the MPM candidate list instead of referring to mode B. In this case, since availability of mode B does not need to be checked, it is possible to reduce complexity in the video encoder and the video decoder in comparison with the above-mentioned examples.

In another example, when the first MPM candidate is fixed to the planar mode, the prediction module may allocate the intra prediction mode of a latest-encoded or latest-decoded block as the second MPM candidate to the MPM candidate list instead of referring to mode A or mode B. When the intra prediction mode of the latest-encoded or latest-decoded block is unavailable or is the planar mode, the DC mode may be allocated as the second MPM candidate to the MPM candidate list. Here, the case where the intra prediction mode of the latest-encoded or latest-decoded block is unavailable may include a case where the block is a block encoded or decoded in the inter mode. The latest-encoded or latest-decoded block may be, for example, a PU. In this case, since availability of mode A and availability of mode B do not need to be checked, it is possible to reduce complexity in the video encoder and the video decoder.

On the other hand, in the above-mentioned examples, it is assumed that the number of MPM candidates constituting the MPM candidate list is fixed to 2, but the present invention is not limited to these examples. For example, the process of inducing the MPM candidates and the process of allowing the induced MPM candidates to the MPM candidate list may be identically or similarly applied to a case where the number of MPM candidates constituting the MPM candidate list is fixed to 3. Here, two MPM candidates are induced in the above-mentioned examples. Accordingly, when the number of MPM candidates constituting the MPM candidate list is fixed to 3, an additional MPM candidate may be further derived in addition to the two MPM candidates. Here, examples of the additionally-induced MPM candidate include the planar mode, the DC mode, and the vertical mode.

An example of the method of inducing MPM candidates and constructing an MPM candidate list when the number of MPM candidates constituting the MPM candidate list is fixed to 3 will be described below. The process of constructing the MPM candidate list to be described below may be performed by the prediction module of the video encoder and/or the video decoder.

The method of constructing the MPM candidate list when the number of MPM candidates is fixed to 3 may be embodied in various aspects. All possible combinations for embodying the various aspects will not be described in the examples to be described below, but it will be understand by those skilled in the art that other combinations are possible.

First, the prediction module may determine MPM candidate A corresponding to block A on the basis of block A adjacent to the left side of the current block and may determine MPM candidate B corresponding to block B on the basis of block B adjacent to the upper side of the current block As described above, the prediction module may use the intra prediction mode of a neighboring block themselves (for example, block A or block B) as the MPM candidate corresponding to the neighboring block, but may use a particular intra prediction mode determined depending on a predetermined condition as the MPM candidate corresponding to the neighboring block.

For example, when the neighboring block (for example, block A or block B) is a block located outside the current picture and/or the current slice to which the current block belongs, the intra prediction mode of the neighboring block may be unavailable. Accordingly, in this case, the prediction module may set the MPM candidate corresponding to the neighboring block to the DC mode. For example, when block A is a block located outside the current picture and/or the current slice, MPM candidate A may be set to the DC mode. When block B is a block located outside the current picture and/or the current slice, MPM candidate B may be set to the DC mode.

When the prediction mode of the neighboring block (for example, block A or block B) is not an intra mode, that is, when the neighboring block is not a block encoded or decoded using the intra mode, the neighboring block may not have intra prediction mode information. Accordingly, in this case, the prediction module may set the MPM candidate corresponding to the neighboring block to the DC mode. For example, when the prediction mode of block A is not an intra mode, MPM candidate A may be set to the DC mode. When the prediction mode of block B is not an intra mode, MPM candidate B may be set to the DC mode.

When block B adjacent to the upper side of the current block is located outside the coding tree block (CTB) to which the current block belongs, MPM candidate B corresponding to block B may be set to the DC mode.

Otherwise, the MPM candidate corresponding to the neighboring block (for example, block A or block B) may be determined to be the intra prediction mode of the neighboring block. For example, MPM candidate A may be set to mode A which is the intra prediction mode of the block A and MPM candidate B may be set to mode B which is the intra prediction mode of block B.

When MPM candidate A and MPM candidate B are determined through the above-mentioned processes, the prediction module may construct the MPM candidate list on the basis of the determined MPM candidates.

For example, MPM candidate A and MPM candidate B may be equal to each other. Here, when MPM candidate A is the planar mode or the DC mode, the planar mode may be allocated as the first MPM candidate to the MPM candidate list, the DC mode may be allocated as the second MPM candidate, and the vertical mode may be allocated as the third MPM candidate. At this time, an MPM index value of 0 may be allocated to the planar mode, an MPM index value of 1 may be allocated to the DC mode, and an MPM index value of 2 may be allocated to the vertical mode.

When MPM candidate A and MPM candidate B are equal to each other and MPM candidate A is not the planar mode nor the DC mode, MPM candidate A may be allocated as the first MPM candidate to the MPM candidate list and two intra prediction modes having prediction directions most similar or adjacent to the prediction direction of MPM candidate A may be allocated as the second and third MPM candidates to the MPM candidate list. At this time, an MPM index value of 0 may be allocated to MPM candidate A and MPM index values of 1 and 2 may be allocated to the second and third MPM candidates.

In another example, MPM candidate A and MPM candidate B may be different from each other. In this case, the prediction module may allocate MPM candidate A and MPM candidate B to predetermined fixed positions in the MPM candidate list. That is, the MPM index values allocated to MPM candidate A and MPM candidate B may be predetermined fixed values. As described above, when MPM candidate A and MPM candidate B are allocated to predetermined fixed positions in the MPM candidate list, the computing operation of comparing the mode values of MPM candidate A and MPM candidate B may be removed and it is thus possible to reduce complexity.

For example, the prediction module may allocate MPM candidate A as the first MPM candidate to the MPM candidate list and may allocate MPM candidate B as the second MPM candidate to the MPM candidate list. At this time, an index value of 0 may be allocated to MPM candidate A and an index value of 1 may be allocated to MPM candidate B.

When MPM candidate A and MPM candidate B are different from each other, the prediction module may allocate an additional intra prediction mode as the third MPM candidate to the MPM candidate list. At this time, an index value of 2 may be allocated to the additionally-allocated third MPM candidate.

For example, when any of MPM candidate A and MPM candidate B is not the planar mode, the intra prediction mode additionally allocated as the third MPM candidate to the MPM candidate list may be the planar mode. Otherwise (when one of MPM candidate A and MPM candidate B is the planar mode), when any of MPM candidate A and MPM candidate B is not the DC mode, the intra prediction mode additionally allocated as the third MPM candidate to the MPM candidate list may be the DC mode. Otherwise (when one of MPM candidate A and MPM candidate B is the planar mode and the other is the DC mode), the intra prediction mode additionally allocated as the third MPM candidate to the MPM candidate list may be the vertical mode.

In the above-mentioned example, for example, when the prediction mode numbers are allocated as in 420 of FIG. 4, the mode value of the planar mode may be 0, the mode value of the DC mode may be 1, and the mode value of the vertical mode may be 26.

The process of constructing the MPM candidate list in the above-mentioned examples may be similarly applied to the video encoder and the video decoder. When the MPM candidate list is constructed, the constructed MPM candidate list may be used to generate the intra prediction mode information as described above. The MPM candidate list constructed by the video decoder may be used to determine the intra prediction mode of the current block as described above with reference to FIG. 6.

Figure 8:
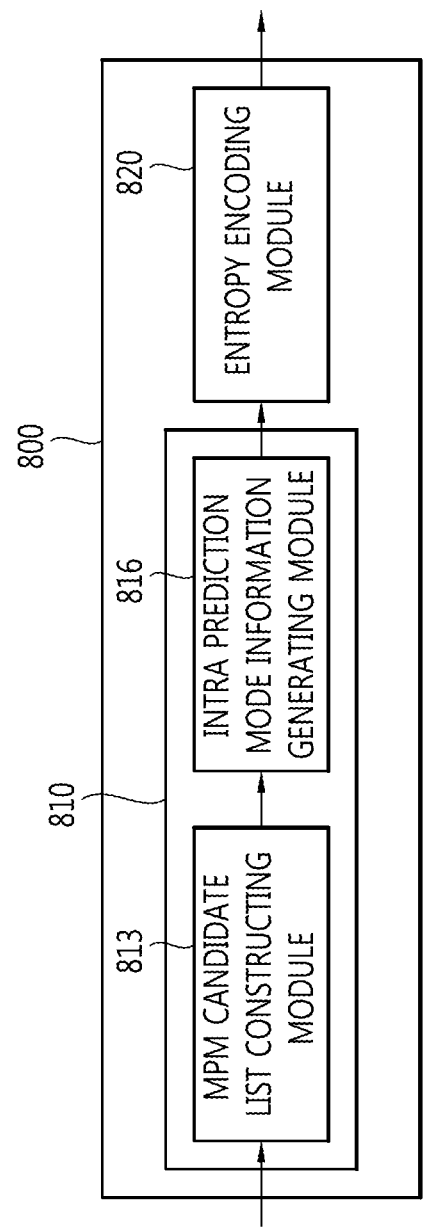
FIG. 8 is a block diagram schematically illustrating an example of a video encoder that transmits intra prediction mode information according to the present invention.

FIG. 8 is a block diagram schematically illustrating an example of a video encoder that transmits the intra prediction mode information according to the present invention.

In the example illustrated in FIG. 8, the video encoder 800 may include a prediction module 810 and an entropy encoding module 820. The prediction module may further include an MPM candidate list constructing module 813 and an intra prediction mode information generating module 816.

In the example illustrated in FIG. 8, the process of constructing the MPM candidate list and the process of generating the intra prediction mode information are described to be performed by different elements, but this is intended for convenience of explanation and understanding of the present invention and the present invention is not limited to this configuration. For example, the process of constructing the MPM candidate list and the process of generating the intra prediction mode information may be a part of a series of processes which are performed by the prediction module. In addition, the MPM candidate list constructing module 813 and/or the intra prediction mode information generating module 816 may be included as individual elements in the video encoder.

Referring to FIG. 8, the MPM candidate list constructing module 813 may construct the MPM candidate list including plural MPM candidates.

The MPM candidate list constructing module 813 may induce at least one MPM candidate on the basis of the intra prediction mode of at least one neighboring block adjacent to the current block and may allocate the induced MPM candidate to the MPM candidate list. At this time, the MPM candidate list constructing module 813 may use the intra prediction mode of the neighboring block as the MPM candidate corresponding to the neighboring block, or may use a particular intra prediction mode determined depending on a predetermined condition as the MPM candidate corresponding to the neighboring block. For example, the current block and the neighboring block may be blocks corresponding to a PU.

The examples of the process of constructing the MPM candidate list are described above with reference to FIGS. 5 to 7 and thus specific description thereof will not be repeated herein.

Referring to FIG. 8 again, the intra prediction mode information generating module 816 may generate information on the intra prediction mode on the basis of the MPM candidate list.

The intra prediction mode information generated by the intra prediction mode information generating module 816 may include MPM flag information, MPM index information, and remaining mode information. Specific examples of the intra prediction mode information generated by the video encoder are described above with reference to FIG. 5 and thus specific description thereof will not be repeated herein.

Referring to FIG. 8 again, the entropy encoding module 820 may perform an entropy encoding operation on the intra prediction mode information. The entropy encoding module 820 may transmit the entropy-encoded information to the video decoder. Here, the transmitting process is described to be performed by the entropy encoding module 820, but this is intended for convenience of explanation and the present invention is not limited to this configuration. For example, the transmitting process may be performed by a transmission module included as a particular module in the video encoder.

FIG. 8 schematically illustrates operations and elements of the video encoder so as to easily understand the present invention in consideration of details relevant to the intra prediction mode, but this is for convenience of explanation and the operations and elements of the video encoder in the present invention may include all the operations and elements described with reference to FIG. 1.

Figure 9:
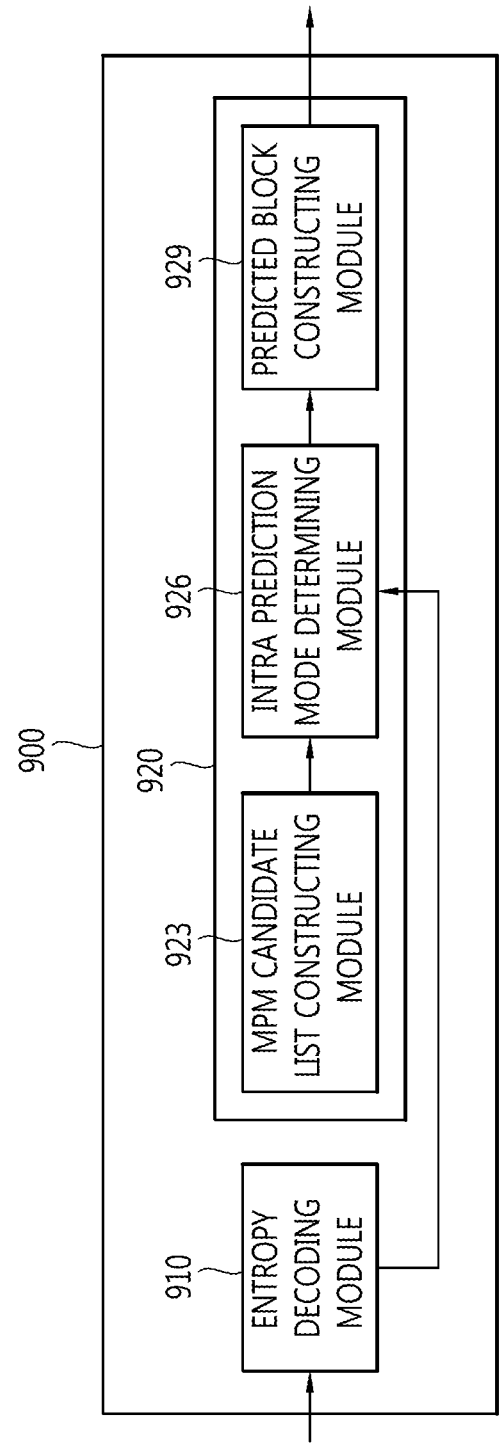
FIG. 9 is a block diagram schematically illustrating an example of a video decoder that performs intra prediction according to the present invention.

FIG. 9 is a block diagram schematically illustrating an example of a video decoder that performs an intra prediction according to the present invention.

In the example illustrated in FIG. 9, the video decoder 900 may include an entropy decoding module 910 and a prediction module 920. The prediction module may further include an MPM candidate list constructing module 923, an intra prediction mode determining module 926, and a predicted block constructing module 929.

In the example illustrated in FIG. 9, the process of constructing an MPM candidate list, the process of determining an intra prediction mode, and the process of constructing a predicted block are described to be performed by different elements, but this is for convenience of explanation and understanding of the present invention and the present invention is not limited to this configuration. For example, the process of constructing an MPM candidate list, the process of determining an intra prediction mode, and the process of constructing a predicted block may be a part of a series of processes performed by the prediction module. In addition, the MPM candidate list constructing module 923 and/or the intra prediction mode determining module 926 may be included as individual elements in the video decoder.

Referring to FIG. 9, the entropy decoding module 910 may receive information on the intra prediction mode from the video encoder and may entropy-decode the received information. The intra prediction mode information received from the video encoder may include MPM flag information, MPM index information, and/or remaining mode information. Here, the receiving process is described to be performed by the entropy decoding module 910, but this is for convenience of explanation and the present invention is not limited to this configuration. For example, the receiving process may be performed by a receiving module included as a particular element in the video decoder.

Referring to FIG. 9 again, the MPM candidate list constructing module 923 may construct an MPM candidate list including plural MPM candidates. At this time, the MPM candidate list constructing module 923 may induce the MPM candidates and may construct the MPM candidate list in the same way as in the video encoder.

The MPM candidate list constructing module 923 may induce at least one MPM candidate on the basis of the intra prediction mode of at least one neighboring block adjacent to the current block and may allocate the induced MPM candidate to the MPM candidate list. At this time, the MPM candidate list constructing module 923 may use the intra prediction mode of the neighboring block as the MPM candidate corresponding to the neighboring block, or may use a particular intra prediction mode determined depending on a predetermined condition as the MPM candidate corresponding to the neighboring block. For example, the current block and the neighboring block may be blocks corresponding to a PU.

The examples of the process of constructing the MPM candidate list are the same as in the video encoder and are described above with reference to FIGS. 5 to 7 and thus specific description thereof will not be repeated herein.

Referring to FIG. 9 again, the intra prediction mode determining module 926 may determine the intra prediction mode of the current block on the basis of the MPM candidate list and the intra prediction mode information.

The intra prediction mode determining module 926 may determine whether an MPM candidate to be used as the intra prediction mode of the current block is present in the plural MPM candidates included in the MPM candidate list on the basis of the MPM flag information received from the video encoder. When an MPM candidate to be used as the intra prediction mode of the current block is present in the MPM candidate list, the intra prediction mode determining module 926 may determine the MPM candidate indicated by the MPM index information to be the intra prediction mode of the current block When an MPM candidate to be used as the intra prediction mode of the current block is not present in the MPM candidate list, the intra prediction mode determining module 926 may determine the intra prediction mode of the current block on the basis of the MPM candidate list and the remaining mode information received from the video encoder.

Referring to FIG. 9 again, the predicted block constructing module 929 may construct a predicted block corresponding to the current block by performing an intra prediction on the current block on the basis of the intra prediction mode of the current block.

FIG. 9 schematically illustrates operations and elements of the video decoder so as to easily understand the present invention in consideration of details relevant to the intra prediction mode, but this is for convenience of explanation and the operations and elements of the video decoder in the present invention may include all the operations and elements described with reference to FIG. 2.

While the methods in the above-mentioned embodiments have been described on the basis of the flowcharts as a series of steps or blocks, the invention is not limited to the order of the steps and a certain step may be performed in an order other than described above or at the same time as described above. The above-mentioned embodiments include various examples. Therefore, the invention includes all substitutions, corrections, and modifications belonging to the appended claims.

When it is mentioned above that an element is "connected to" or "coupled to" another element, it should be understood that still another element may be interposed therebetween, as well as that the element may be connected or coupled directly to another element. On the contrary, when it is mentioned that an element is "connected directly to" or "coupled directly to" another element, it should be understood that still another element is not interposed therebetween.

The invention claimed is:

1. A video decoding method comprising the steps of:
receiving, by a decoding apparatus, index information indicating a candidate mode to be used as an intra prediction mode of a current block;
constructing, by the decoding apparatus, a candidate mode list including a plurality of candidate modes for the current block;
determining, by the decoding apparatus, as the intra prediction mode of the current block, the candidate mode indicated by the index information out of the plurality of candidate modes constituting the candidate mode list; and
generating, by the decoding apparatus, a predicted sample in the current block by performing intra prediction on the current block on the basis of the determined intra prediction mode,
wherein the constructing the candidate mode list includes:
setting a first candidate intra prediction mode corresponding to a first block adjacent to the left side of the current block and a second candidate intra prediction mode corresponding to a second block adjacent to the upper side of the current block, and setting a first ordered candidate mode and a second ordered candidate mode among the candidate modes of the candidate mode list, wherein the first ordered candidate mode is set equal to a planar mode and the second ordered candidate mode is set equal to a DC mode if the first candidate intra prediction mode is a planar mode and the second block is unavailable, wherein the first ordered candidate mode is set equal to the planar mode and the second ordered candidate mode is set equal to the DC mode if the both of the first block and the second block are not available.

2. The video decoding method according to claim 1, wherein the second candidate intra prediction mode is set to be the DC mode when the second block is not available.

3. The video decoding method according to claim 2, wherein the constructing the candidate mode list includes determining that the first block is not available when the first block is located outside a current picture, a current slice or a current coding tree block and determining that the second block is not available when the second block is located outside of the current picture, the current slice or a current coding tree block.

4. The video decoding method according to claim 2, wherein the constructing the candidate mode list includes determining that the first block is not available when the first block is not a block decoded with an intra mode and determining that the second block is not available when the second block is not a block decoded with an intra mode.

5. The video decoding method according to claim 1, wherein the first candidate intra prediction mode is set to the first ordered candidate mode and the second candidate intra prediction mode is set to the second ordered candidate mode when the first candidate intra prediction mode and the second candidate intra prediction mode are not equal to each other.

6. The video decoding method according to claim 5, wherein an index value of 0 is allocated to the first ordered candidate mode and an index value of 1 is allocated to the second ordered candidate mode.

7. The video decoding method according to claim 1, wherein the constructing the candidate mode list includes:

setting a planar mode to a third candidate mode in the candidate mode list when neither of the first candidate intra prediction mode and the second candidate intra prediction mode is the planar mode, setting a DC mode to the third candidate mode in the candidate mode list when one of the first candidate intra prediction mode and the second candidate intra prediction mode is the planar mode and neither of the first candidate intra prediction mode and the second candidate intra prediction mode is a DC mode, and setting a vertical mode to the third candidate mode in the candidate mode list when one of the first candidate intra prediction mode and the second candidate intra prediction mode is the planar mode and the other is the DC mode.

8. The video decoding method according to claim 7, wherein an index value of 2 is allocated to the third candidate mode.

9. The video decoding method according to claim 1, wherein the planar mode is set to the first ordered candidate mode and the DC mode is set to the second ordered candidate mode when the first candidate intra prediction mode and the second candidate intra prediction mode are the planar mode.

10. The video decoding method according to claim 1, wherein the planar mode is set to the first ordered candidate mode and the DC mode is set to the second ordered candidate mode when the first candidate intra prediction and the second candidate intra prediction mode are the DC mode.

11. The video decoding method according to claim 1, wherein the first candidate intra prediction mode is set to the first ordered candidate mode in the candidate mode list and a prediction mode having a prediction direction most similar or adjacent to a prediction direction of the first candidate intra prediction mode is set to the second ordered candidate mode when the first candidate intra prediction is neither a planar mode nor a DC mode.

12. The video decoding method according to claim 1, further comprising receiving a flag specifying whether a candidate mode to be used as the intra prediction mode of the current block is present in the candidate modes constituting the candidate mode list.

13. The video decoding method according to claim 12, further comprising receiving remaining prediction mode corresponding to the intra prediction mode of the current block when the flag specified that the candidate mode to be used as the intra prediction mode of the current block is not present in the plural candidate modes.

* * * * *